United States Patent
Bandy, Jr. et al.

[11] Patent Number: 5,871,261
[45] Date of Patent: Feb. 16, 1999

[54] LONGWALL MINE FACE CONVEYOR PAN AND METHOD OF FABRICATING

[75] Inventors: Clarence Lee Bandy, Jr., Glade Springs; Gregory Warren Smith, Bristol, both of Va.

[73] Assignee: Longwall-Associates, Inc., Chilowie, Va.

[21] Appl. No.: 842,089

[22] Filed: Apr. 28, 1997

[51] Int. Cl.⁶ .......................... B65G 19/28; E21C 35/20
[52] U.S. Cl. .................. 299/43; 198/735.1; 198/860.1
[58] Field of Search .......................... 299/43; 198/735.1, 198/735.2, 735.3, 860.1, 860.2, 860.3

[56] References Cited

U.S. PATENT DOCUMENTS

| | | | |
|---|---|---|---|
| 3,752,299 | 8/1973 | Blumenthal et al. | 198/735.2 |
| 4,013,167 | 3/1977 | Bourgeois | 198/860.2 |
| 4,373,757 | 2/1983 | Gehle et al. | 299/43 |
| 4,484,677 | 11/1984 | Behwald | 198/735.1 |
| 4,632,239 | 12/1986 | Schoop et al. | 198/735.4 |
| 4,637,510 | 1/1987 | Tomlinson | 198/735.4 |
| 5,131,724 | 7/1992 | Bandy, Jr. et al. | 299/43 |

*Primary Examiner*—David J. Bagnell
*Attorney, Agent, or Firm*—Luedeka, Neely & Graham, P.C.

[57] ABSTRACT

A modular pan assembly for a longwall mine face conveyor includes an elongated deck plate flanked by a pair of parallel, elongated side rails to define the conveyor system feed path. Beveled longitudinal edges of the deck plate mesh into corresponding channels along inside surfaces of the side rails. Apertures penetrate side rails from outside surfaces into the floor of respective channels. The assembly is secured by welds between the side rails and the deck plate within the apertures and along a lower side rail channel wall.

15 Claims, 3 Drawing Sheets

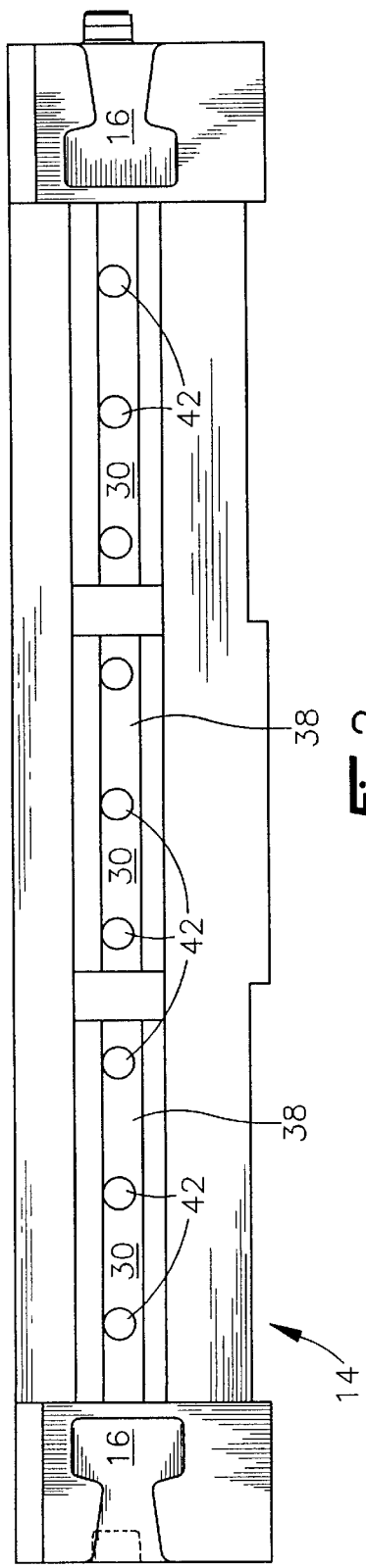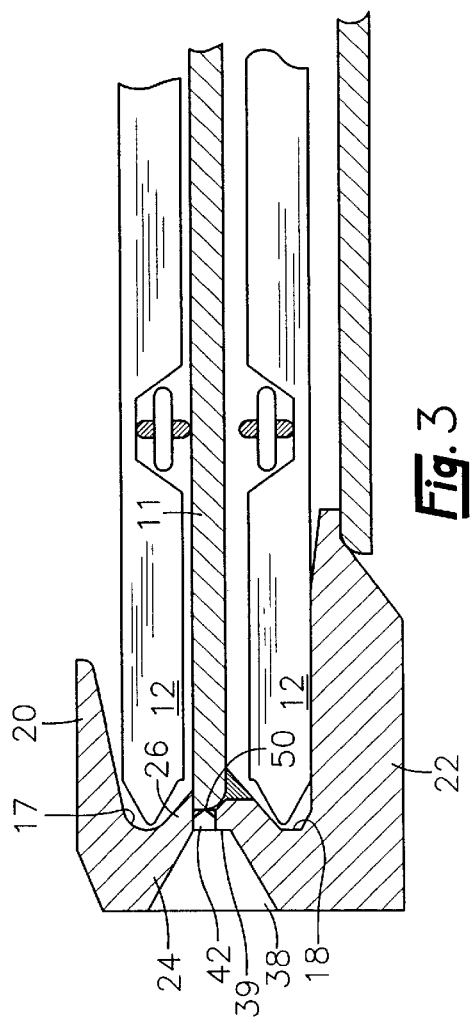

LONGWALL MINE FACE CONVEYOR PAN AND METHOD OF FABRICATING

BACKGROUND OF THE INVENTION

The present invention relates to the field of conveyors, and more particularly, to a modular pan assembly for an armored face conveyor, such as for handling coal in a longwall face mining system.

Armored face conveyors are the foundation for longwall face mining machines. Typically, the conveyor line pan module includes a hardened steel deck plate secured to supporting cast steel side rails. A plurality of these modular pans are assembled in end-to-end relationship to form a complete conveyor system for moving coal or other mineral along and away from the mine face under active excavation.

The pan assembly side rails additionally support the haulage system for the shearer which is the mine face cutting mechanism. A scraper chain extends along the entire conveyor system length with spaced flights serving to move the coal along the deck plate. Clearly, the strength of the armored face mining conveyor and its structural integrity is of a primary concern. Eliminating structural failures in the conveyor system, and thus minimizing down time, is important to assure an efficient longwall mining operation.

The operating environment of a mine is extremely harsh on mechanical equipment of all forms. The very nature of the work objective is to cut and remove abrasive material. Moreover, the abrasive material is fluidized in the presence of water and contaminated oil. In the case of material removal conveyors, the abrasive aggregate is wiped along the conveyor pan surfaces to exacerbate the grinding destruction.

In addition to the abrasive and corrosive nature of the environment, the machinery is subjected to extreme ranges of shock, mechanical twisting, racking and concentrated stresses due to uneven support surfaces.

Accordingly, mining equipment of all types and armored, longwall mine face conveyors in particular, suffer frequent disabilities and breakdowns.

In a successful earlier prior art effort to improve the operational life and reliability of longwall mine face conveyors, U.S. Pat. No. 5,131,724 taught a conveyor module construction method and apparatus wherein no conveyor module assembly welds were applied along the material transfer surfaces of the conveyor pan thereby avoiding exposure of the softer weld metal to the abrasive grinding of the mined and frequently, wet, aggregate as it slides along conveyor pan surface.

In this context, it is helpful to understand that the side rails are cast from abrasion resistant, high alloy cast steel. The decks are formed from hot rolled, abrasion resistive high alloy steel. Both materials are subject to stress cracking and hydrogen embrittlement. Collectively, both the rail and deck plate are not only considerably harder than the weld metals that hold the plate and rails together but application of a weld bead to these high alloy materials is more difficult than to more common metals.

Central to U.S. Pat. No. 5,131,724 invention was a key and slot relationship between the conveyor pan deck plate and the side rails. The side rails were cast with elongated slots in the rail web section between the top and bottom sigma flanges. Cooperatively, the deck plate longitudinal edges were notched to provide tabular key salients that were dimensioned to correspond with the slots.

In assembly, the deck keys were inserted through the side rail slots and secured by welding along the outside surfaces of the rail web and deck plate key edges. Material bearing loads were supported by the sectional shear profiles of the deck plate keys. The key plan surfaces were bedded within respective rail slots. The welds only had to resist the shear of lateral disassembly stress.

Although operationally successful and less expensive to manufacture than prior art predecessors, the U.S. Pat. No. 5,131,724 invention left some room for manufacturing cost improvement. It is, therefore, an object of the present invention to provide a longwall mine face conveyor having no welds in direct surface exposure to the mined aggregate and a minimum of assembly weld bead.

Another object of the present invention is provision of a shear resisting area corresponding to the deck plate thickness that extends continuously along the full length of the deck plate.

A still further object of the present invention is a meshing self alignment of matching surfaces between the longwall mine face conveyor deck plate and side rails to facilitate rapid and accurate assembly alignment.

An additional object of the present invention is a longwall mine face conveyor module that assembles with a minimum of welding bead.

Additional objects, advantages and other novel features of the invention will be set forth in part in the description that follows and in part will become apparent to those skilled in the art upon examination of the following or may be learned with the practice of the invention. Even more objectives and advantages of the invention may be realized and obtained by means of the instrumentalities and combinations particularly pointed out in the appended claims.

SUMMARY OF THE INVENTION

To achieve the foregoing and other objects and advance the purposes of the present invention as described herein, the longwall mine face conveyor pan assembly of the present invention comprises an elongated deck plate supported between a pair of parallel side rails. The parallel side rails are preferably of a sigma (Σ) configured cross-section having upper and lower longitudinal flanges spaced apart by a V-section web. The web ridge formed by the V-section apex is oriented to the inside portion of the assembly adjacent the deck plate. This web ridge is substantially truncated by a channel extended along the respective side rail length.

The channel is defined by a pair of longitudinally parallel side walls that converge toward a channel floor. The channel floor depth from the inside web surface is less than the web thickness between the inside and outside surfaces thereby leaving a web thickness remainder between the channel floor and the web outside surface.

Preferably, the topside channel wall intersects the channel floor normally and the bottom side channel wall intersects the channel floor at a convergent angle relative to the topside wall plane. Such convergent angle is consistent with a bevel surface along a lower corner of a cooperative longitudinal deck plate edge. The longitudinal deck plate edges are beveled to an edge face width that is approximately the same as the channel floor width for surface-to-surface juxtaposition between the deck plate edge face and the channel floor.

Traversing the web thickness remainder between the web outside surface and the channel floor are a multiplicity of holes, preferably circular, having a diameter approximately corresponding to the channel floor width. These holes are distributed at conveniently spaced intervals along the length of the respective side rail.

The assembly process of the rails to the deck plate includes a compressive clamping of the deck plate edges into the deck plate channels and abutment of the deck plate edge faces with the channel floors. While assembled under clamping pressure, the side rail webs are welded to the deck plate edge faces around the juncture of the web hole walls with the channel floor. Additionally, a weld bead line is laid along the underside of the deck plate at conjunction with the lower channel wall.

BRIEF DESCRIPTION OF THE DRAWINGS

The accompanying drawings of the invention form an integral element of the invention specification and the following Detailed Description of the Preferred Embodiment. These drawings illustrate several aspects of the present invention and when considered together with the Detailed Description of the Preferred Embodiment serve to explain the principles of the invention. In the drawing:

FIG. 2 is a side elevation view of the invention;

FIG. 3 is a partial cross-section viewed along cutting plane 3—3 of FIG. 2; and, FIG. 4 is an enlarged detail of the assembled interface between the deck plate edge and a side rail.

DETAILED DESCRIPTION OF THE PREFERRED EMBODIMENT

Figure 1:
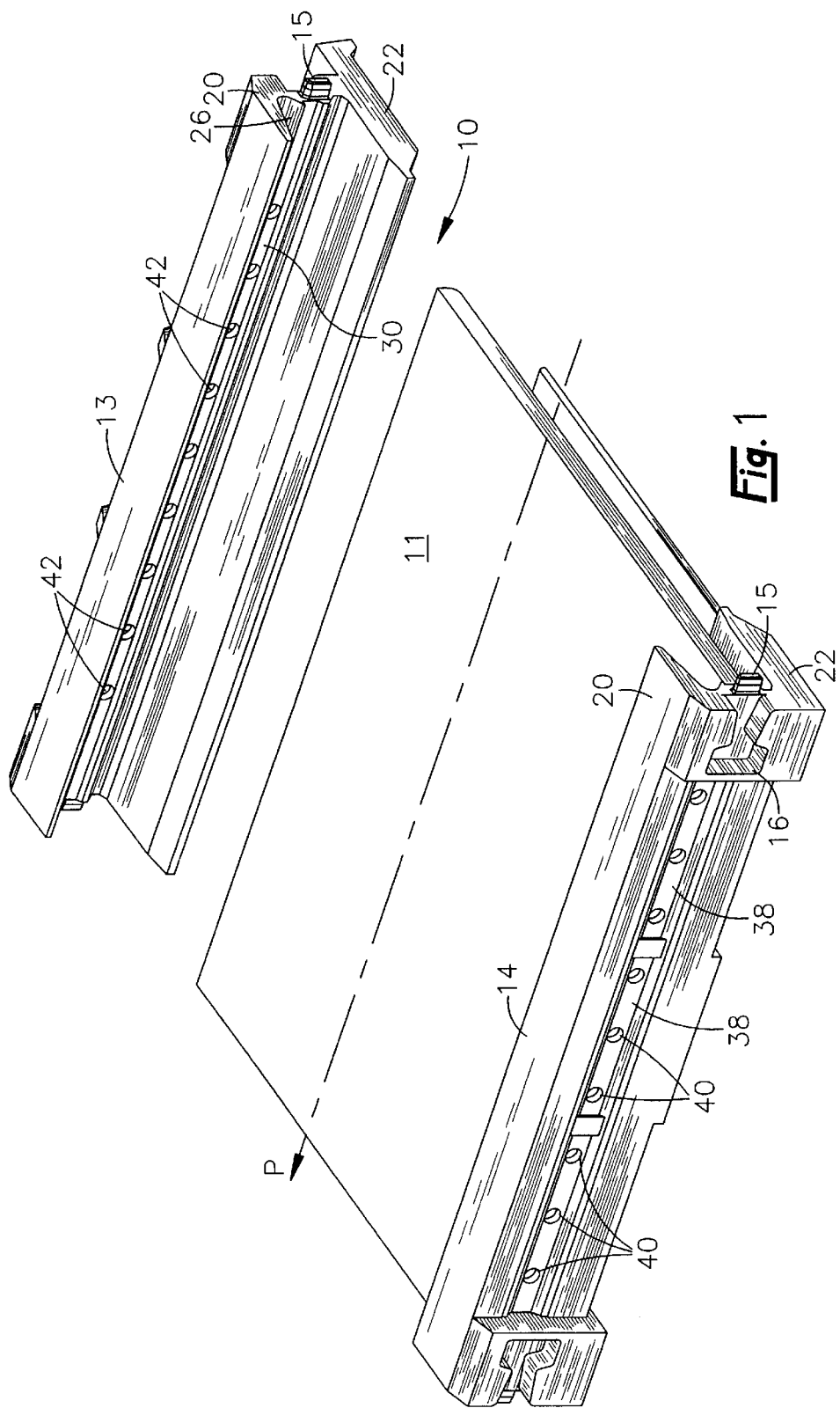
FIG. 1 is a perspective exploded view of the present conveyor pan assembly.

For a more complete review and analysis of the preferred embodiment of the invention, reference is first made to FIG. 1 of the drawings wherein there is shown a longwall mine face conveyor pan assembly 10 especially adapted for use with an armored face conveyor system for handling coal or the like. An elongated deck plate 11 serves to define the coal production feed path P along the longitudinal axis A of the conveyor system. As is conventional, transport of the coal along the conveyor pan assembly 10 is by a scraper chain with individual flights 12 (FIG. 3).

A pair of parallel side rails 13 and 14, preferably formed as sigma (Σ) sections and extending along opposite sides of the deck plate 11, further define the material feed path P. To support the heavy loads of coal transported along the deck plate 11 by the scraper chain conveyor, the deck plate 11 is preferably formed of highly alloyed, high tensile strength, abrasion resistive, quenched and treated steel that is hardened to about 400 Brinnel. Dimensionally, the pan assembly is about 1.5 to 1.7 meters long and about 0.8 to 1.2 meters wide and weighs about 5000 pounds. The deck plate is about 25 to 50 mm thick and weighs 700 to 1400 pounds. The sigma section side rails 13 and 14 are preferably fabricated from abrasion resistive cast steel. Each rail weighs about 1500 pounds and when assembled according to the present invention with the deck plate 11, provide substantially enhanced strength to the composite structure. The sigma section rail profile is a standard of the industry to provide concave guide walls 17 and 18 for the scraper chain flights 12. The upper walls 17 are in direct contact with the aggregate material scraped along by the upper chain flights whereas the lower concave walls 18 guide and align the flight returns but do not transport mine aggregate.

Each conveyor pan assembly 10 is only one module of a series that is linked together by "dog bone" straps not shown. Alignment pins 15 projecting from one end of each side rail 13 and 14 penetrate corresponding sockets not shown on the opposite end of each side rail. Strap pockets 16 receive the dogbone straps to keep adjacent pan assemblies within a required longitudinal proximity and maintain penetration proximity of the alignment pins 15 with corresponding sockets.

Figure 4:
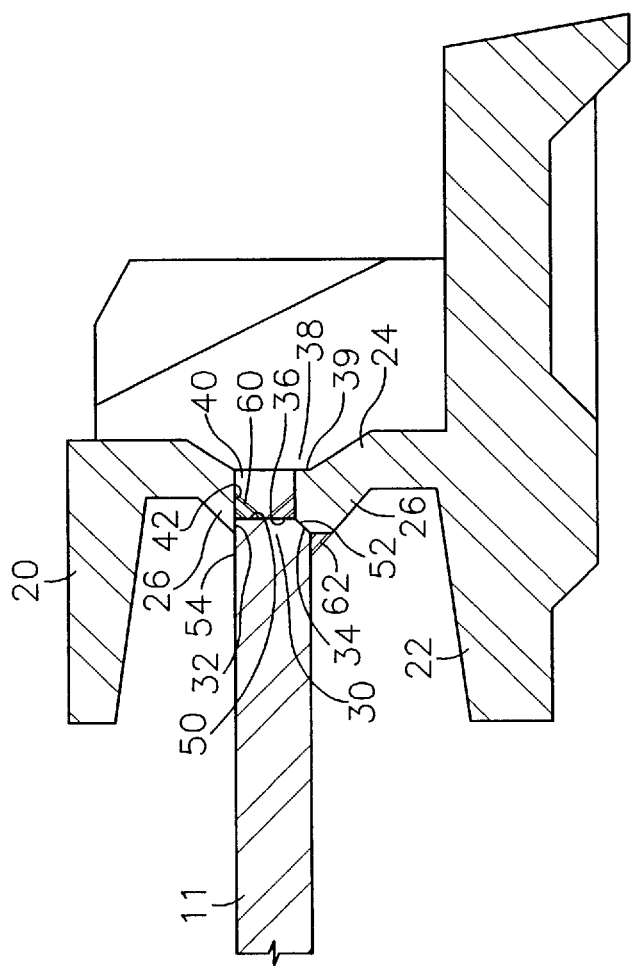

Relative to FIGS. 3 and 4, the sigma sections of the side rails 13 and 14 comprise top and bottom longitudinal flanges 20 and 22 separated by a longitudinal web 24. The web is V-sectioned. The truncated apex of the V-section is oriented toward the pan inside to provide an inside ridge 26 running along the web length between the oppositely facing side rail flanges 20 and 22.

Between the inside and outside surfaces, the ridge 26 thickness is about 35 mm. This ridge 26 is truncated along the web length by a channel 30 defined by side walls 32 and 34 and a channel floor 36. Longitudinally, the channel side walls 32 and 34 are parallel but the side wall planes are skewed to a convergent angle. In a preferred embodiment, the topside channel wall 32 is substantially normal to the channel floor 36. Substantially all of the convergent bevel angle of the preferred embodiment is applied to the bottom side channel wall 36.

The outside surface of the web 24 follows a trough section 38 roughly corresponding to an opposite of the web ridge 26. Consequently the web outside trough 38 has a trough bottom 39 that is generally parallel planar with the channel floor 36.

Between the outside surface of the web 24 along the trough bottom 39 and the web inside surface along the channel floor 36 is a web thickness remainder 40 of about 20 to 30 mm penetrated by apertures 42, preferably circular or cylindrical, of a diameter approximately corresponding to the channel floor width, also about 20 to 30 mm. The channel floor width is determined by the distance between the lines of intersection by the channel side walls 32 and 34 with the plane of the channel floor. This is a significant dimension.

The conveyor pan deck plate of the present invention is distinguished by continuous longitudinal edges that are beveled to an edge face 50 having a width corresponding to the channel floor width 36, about 20 to 30 mm. Pursuant to the preferred embodiment of the invention, the lower corner edge of the deck plate is beveled to a plane 52 having an angle relative to the edge face plane 50 that corresponds with the angle between the channel floor 36 and the lower channel wall 34. Preferably, the beveling process is by means of a specially jigged milling machine tool. At some sacrifice of time and accuracy, other processes such as flame cutting, laser cutting and grinding may also be used.

The upper surface 54 of the deck plate 11 is substantially normal to the edge face 50 along the area of assembly abutment with the upper channel wall 32.

Fabrication assembly of the side rails 13 and 14 to the deck plate 11 requires a sufficient alignment of the rail channels 30 with respective deck plate edges that clamping compression between the elements drives the deck plate edge face 50 into juxtaposition with the channel floor 36. Due to the mass and weight of the assembled elements, overhead cranes and industrial lift trucks are used to position the elements. Hydraulic clamps or mechanical jack screws are used for assembly binding and compression. So positioned, weld beads 60 are applied between the rail web 24 and the deck plate edge face 50 at the juncture of the aperture 42 walls.

Additionally, a continuous weld bead 62 is applied along the deck plate bottom at the meeting line of the two beveled surface planes 34 and 52.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A longwall mine face conveyor pan for the transfer of aggregate material comprising:

a pair of parallel side rails laterally separated by an elongated deck plate, each of said side rails having upper and lower longitudinal flanges separated substantially equidistantly along the lengths thereof by an elongated web section, said web section having a thickness between an inside face and an outside face, a longitudinal channel in said web inside face to a depth less than said web thickness, said parallel side rails being aligned with respective longitudinal channels in facing opposition to receive substantially parallel, longitudinal edges of said deck plate, said channels having relatively converging upper and lower side walls, said deck plate edge having a longitudinal bevel corresponding to said converging channel side walls, a plurality of apertures through a web thickness remainder between said web outside face and a bottom surface of said channel and weld beads within said apertures joining a deck plate edge to an adjacent web section.

2. A mine conveyor pan as described by claim 1 wherein one of said channel side walls is substantially normal to said channel bottom surface.

3. A mine conveyor pan as described by claim 2 having a weld bead between a web section inside face and said deck plate along the other of said channel side walls.

4. A mine conveyor pan as described by claim 1 wherein respective side rails have a cross-sectional shape corresponding substantially to a sigma character with a web ridge between upper and lower side rail longitudinal flanges, said web ridges being disposed along the inside faces of respective webs.

5. A mine conveyor pan as described by claim 4 wherein said web channels substantially truncate an apex of said web ridges.

6. A mine conveyor pan as described by claim 5 wherein one of said channel side walls is substantially normal to said channel bottom surface.

7. A mine conveyor pan as described by claim 6 having a weld bead between a web section inside face and said deck plate along the other of said channel side walls.

8. A mine conveyor pan assembly comprising;

an elongated deck plate defining an aggregate feedpath extending along a longitudinal axis of a conveyor system;

said deck plate having substantially parallel longitudinal edges, at least one corner of each longitudinal edge being beveled;

a pair of parallel side members extending along opposite sides of said deck plate to further define said aggregate feed path, said side members each having respective inside and outside surfaces delineating side member thickness therebetween;

elongated channels into inside surfaces of said side members, said channels being defined by opposite side walls separated by a channel floor at a depth into said side members less than respective side member thickness, substantially parallel planes respective to said side walls converging toward said channel floor at an angle corresponding to the edge bevel of said deck plate; and, a plurality of spaced apertures through said side members between said outside surfaces and said channel floor whereby said beveled deck plate edges mesh with said beveled channel side walls to be welded about the juncture of said aperture with said deck plate edge.

9. A mine conveyor pan assembly as described by claim 8 wherein said apertures include substantially cylindrical walls through said side members, said deckplate edges being welded to said side members within said apertures about a juncture of said aperture walls with respective deck plate edges.

10. A mine conveyor pan assembly as described by claim 8 wherein said deck plate beveled edge is supported along the substantial length thereof by a correspondingly beveled channel side wall.

11. A mine conveyor pan assembly as described by claim 10 wherein one of said channel side walls is normal to said channel floor and another channel side wall converges toward said channel floor at an angle corresponding to said deck plate edge bevel.

12. A mine conveyor pan assembly as described by claim 11 wherein said deck plate is welded to said side members along a line of juncture with said other channel side wall.

13. A mine conveyor pan assembly as described by claim 8 wherein said side members include a top portion, a center portion and a base portion, said center portion being concave along said outside surface and convex along said inside surface so as to substantially form a sigma cross section with said top and base portions.

14. A mine conveyor pan assembly as described by claim 13 wherein said elongated channels truncate a ridge apex of said convex inside surface.

15. A method of fabricating a mine conveyor pan comprising the steps of: providing a pair of elongated side rails having top and bottom elongated flanges separated by an elongated web, respective to each side rail, said web having a section thickness between an inside face and an outside face, an elongated channel in said web inside face having a length between said top and bottom flanges and a depth less than said web thickness, said channel having top and bottom side planes converging into said web thickness to a floor plane therebetween to provide a web remainder thickness between said channel floor plane and said web outside face, intersections of said side planes with said floor plane defining a channel floor width, a plurality of apertures through said web remainder thickness spaced along the length of said channel;

providing a plate member having substantially parallel side edges along a length of said plate member;

at least one longitudinal corner respective each said side edge being beveled to correspond with the convergence of said channel side planes, faces of said side edges having a width substantially corresponding with said channel floor width; assembling said plate member between said pair of said rails to juxtaposition between said side edge faces and respective channel floor planes; welding said pair of side rail webs to said plate member at respective junctures of said web apertures with said side edge faces; and, welding said plate member to said webs along a line of juncture with at least one side plane respective to each of said side rail channels.

\* \* \* \* \*